US012776921B2

(12) United States Patent
Ballard et al.

(10) Patent No.: US 12,776,921 B2
(45) Date of Patent: Oct. 27, 2026

(54) VALIDATING SUBORDINATE MANAGEMENT CONTROLLERS USING SUBORDINATE MANAGEMENT CONTROLLER IDENTITY CERTIFICATES

(71) Applicant: Dell Products L.P., Round Rock, TX (US)

(72) Inventors: Lee E. Ballard, Georgetown, TX (US); Marshal F. Savage, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 19/034,005

(22) Filed: Jan. 22, 2025

(65) Prior Publication Data

US 2026/0213957 A1 Jul. 23, 2026

(51) Int. Cl.
*H04L 9/32* (2006.01)

(52) U.S. Cl.
CPC .................................. *H04L 9/3263* (2013.01)

(58) Field of Classification Search
CPC ...................................................... H04L 9/3263
USPC .......................................................... 713/175
See application file for complete search history.

(56) References Cited

U.S. PATENT DOCUMENTS 12,413,421 B2* 9/2025 Ponnuru ............... H04L 9/3268
2011/0252227 A1* 10/2011 Strong .................. H04L 63/166 713/168
2013/0042105 A1* 2/2013 Orsini ...................... H04L 63/08 713/157
2020/0382312 A1* 12/2020 Rao ....................... H04L 9/0637
2021/0367974 A1* 11/2021 Ponnuru ............. H04L 63/0823
2024/0121110 A1* 4/2024 Shin ..................... G06Q 30/018
2024/0220298 A1* 7/2024 Powell ................ G06F 9/45558
(Continued)

OTHER PUBLICATIONS

"SPDM to Storage Binding Specification"; https://www.dmtf.org/sites/default/files/standards/documents/DSP0286_1.0.0WIP90.pdf; Version: 1.0.0WIP90; Aug. 13, 2024.
(Continued)

*Primary Examiner* — Badrinarayanan
(74) *Attorney, Agent, or Firm* — Ryan, Mason & Lewis, LLP

(57) ABSTRACT

Techniques are provided for validating subordinate management controllers using subordinate management controller identity certificates. One method comprises assigning, in a server device comprising a platform management controller and an accelerator unit having an associated subordinate management controller, a network address to the subordinate management controller, wherein the subordinate management controller is configured to store an identity certificate prior to the assigning; obtaining, from the subordinate management controller, a local domain entry based on information recorded in the identity certificate; obtaining a device certificate chain identifying one or more devices associated with the subordinate management controller, wherein the device certificate chain is authenticated utilizing a certificate authority certificate associated with the subordinate management controller; and utilizing, by the platform management controller, the device certificate chain to validate an integrity of the subordinate management controller, in connection with the subordinate management controller providing a service.

20 Claims, 8 Drawing Sheets

(56) References Cited

U.S. PATENT DOCUMENTS

| | | | | |
|---|---|---|---|---|
| 2024/0388457 A1* | 11/2024 | Gordon | ................. | G06F 21/602 |
| 2025/0200184 A1* | 6/2025 | Kondapi | ............... | G06F 21/572 |
| 2026/0052028 A1* | 2/2026 | Zohrevandi | ........... | H04L 9/3247 |
| 2026/0105147 A1* | 4/2026 | Wright | .................. | G06F 21/554 |

OTHER PUBLICATIONS

"FIDO Device Onboarding (FDO)"; https://fidoalliance.org/device-onboarding-overview/; downloaded Jan. 7, 2025.
Watsen et al.; "Secure Zero Touch Provisioning (SZTP)"; https://www.rfc-editor.org/rfc/rfc8572.html; Apr. 2019.
"OpenBMC Redfish Aggregation"; https://github.com/openbmc/bmcweb/blob/master/AGGREGATION.md; downloaded Jan. 7, 2025.
Leung et al.; "OCP Rack Management Controller (OpenRMC)"; https://www.opencompute.org/documents/openrmc-usageguide-r1-1-draft0-6-1-1-pdf; May 2023.
"SPDM over TCP Binding Specification"; https://www.dmtf.org/sites/default/files/standards/documents/DSP0287_1.0.0WIP99.pdf; Jan. 17, 2024.
"2024 OCP EMEA Summit"; Attested TLS—https://www.opencompute.org/events/past-events/2024-ocp-emea-summit; Lisbon, Portugal; Apr. 24, 2024.
"Microsoft Measured Boot and Host Attestation"; Firmware measured boot and host attestation—Azure Security | Microsoft Learn | Microsoft Learn; Sep. 10, 2024.
"Management Component Transport Protocol (MCTP) Universal Serial Bus (USB) Transport Binding Specification"; https://www.dmtf.org/dsp/DSP0283; Version 1.0.1; May 21, 2024.
"MCTP Over USB Binding Specification"; https://www.dmtf.org/dsp/DSP0283; Version 1.0.0; Nov. 2, 2023.
"Design for Measured Boot of OpenBMC Using TPM"; https://gerrit.openbmc.org/c/openbmc/docs/+/57138; downloaded Jan. 7, 2025.
"Redfish Component Integrity: 6.22 ComponentIntegrity 1.2.3"; https://www.dmtf.org/sites/default/files/standards/documents/DSP2046_2024.1.html#componentintegrity-123; downloaded Jan. 7, 2025.

* cited by examiner

HSM = HARDWARE SECURITY MODULE
CA = CERTIFICATE AUTHORITY
TPM = TRUSTED PLATFORM MODULE
PCR = PLATFORM CONFIGURATION REGISTER

HSM = HARDWARE SECURITY MODULE
CA = CERTIFICATE AUTHORITY
TPM = TRUSTED PLATFORM MODULE
PCR = PLATFORM CONFIGURATION REGISTER

VALIDATING SUBORDINATE MANAGEMENT CONTROLLERS USING SUBORDINATE MANAGEMENT CONTROLLER IDENTITY CERTIFICATES

BACKGROUND

Multiple components of a chassis may have different management controllers. Data processing units (DPUs), graphical processing units (GPUs) and other accelerator units, for example, that may be deployed in such a chassis increasingly include dedicated management controllers. The different management controllers enable performance of actions such as, for example, deployment management, inventory management, power management and thermal management.

SUMMARY

Illustrative embodiments of the disclosure provide techniques for validating subordinate management controllers using subordinate management controller identity certificates. One method includes assigning, in a server device comprising a platform management controller and at least one accelerator unit having an associated subordinate management controller, by the platform management controller, a network address to the subordinate management controller, wherein the platform management controller manages the subordinate management controller, wherein the subordinate management controller manages the at least one accelerator unit, and wherein the subordinate management controller is configured to store an identity certificate prior to the assigning; obtaining, by the platform management controller, from the subordinate management controller, a local domain entry based at least in part on information recorded in the identity certificate; obtaining, by the platform management controller, from the subordinate management controller, a device certificate chain identifying one or more devices associated with the subordinate management controller, wherein the device certificate chain is authenticated utilizing a certificate authority certificate associated with the subordinate management controller; and utilizing, by the platform management controller, the device certificate chain to validate an integrity of the subordinate management controller, in connection with the subordinate management controller providing a service.

Illustrative embodiments can provide significant advantages relative to conventional techniques. For example, technical problems related to such conventional techniques are mitigated in one or more embodiments by validating the subordinate management controllers using identity certificates associated with the subordinate management controller.

These and other illustrative embodiments described herein include, without limitation, methods, apparatus, systems, and computer program products comprising processor-readable storage media.

DETAILED DESCRIPTION

Figure 1:
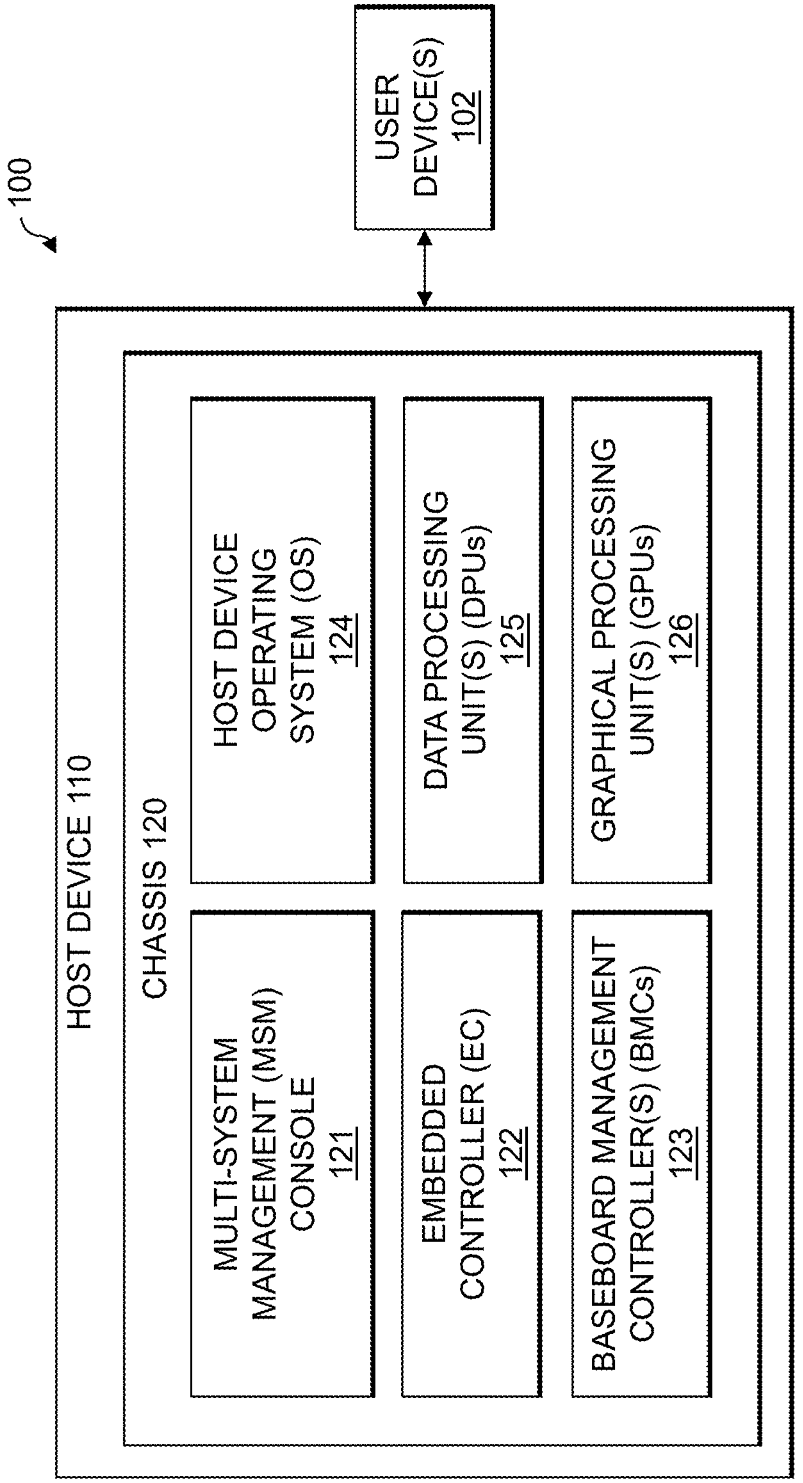
FIG. 1 illustrates an information processing system that may be configured to validate subordinate management controllers using subordinate management controller identity certificates in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As noted above, DPUs, GPUs and other accelerator units increasingly include dedicated management controllers, such as baseboard management controllers. Such dedicated management controllers of the DPUs, GPUs and other accelerator units are often implemented as subordinate management controllers with respect to a platform management controller of a chassis on which the DPUs, GPUs and other accelerator units are deployed. Such subordinate management controllers are often hidden using an internal chassis network or they are obscured using a hypertext transfer protocol (HTTP) reverse proxy that routes requests by to subordinate management controllers acting as origin servers, for example. As used herein, the term "accelerator unit" shall be broadly construed to encompass a field-programmable gate array (FPGA), a GPU, a tensor processing unit (TPU), a video processing unit (VPU), a neural processing unit (NPU), a DPU, an infrastructure processing unit (IPU) or another type of accelerator unit, as would be apparent to a person of ordinary skill in the art.

FIG. 1 depicts an information processing system 100 comprising a host device 110 including a chassis 120 (e.g., a server) comprising chassis components such as, for example, a multi-system management (MSM) console 121, an embedded controller (EC) 122, a baseboard management controller (BMC) 123, a host device operating system (OS) 124, one or more DPUs 125 and one or more GPUs 126. The DPUs and GPUs of FIG. 1, as well as other accelerator units, are discussed further below in conjunction with FIGS. 2 and 3, for example. The chassis 120 may also comprise one or more additional chassis components not shown in FIG. 1 (e.g., expansion cards, disk drives, power supply units, central processing units, memories, etc.).

The MSM console 121 is a web-based chassis management console that utilizes a user interface (UI) which provides access for a user to perform chassis-related deployment, configuring, management and monitoring tasks. For example, blade server deployment and configuration deployments can be controlled via the MSM UI. The MSM UI provides access for a user to configure multiple installed components in a chassis. The EC 122 is a chassis component responsible for performing tasks such as, for example, bare metal deployment, monitoring, logging, inventory management, power management, thermal management, fan profiling, etc. In illustrative embodiments, the EC 122 may have its own operating system, which works in command-line interface (CLI) mode and provides required data and access to the MSM console 121 and MSM UI. Access to the EC 122 can be limited to developers and support team members for debugging; however, some of these actions may be performed using the MSM UI.

In illustrative embodiments, the BMC 123 is a system on check device, which provides individualized access to enterprise servers. The BMC 123 enables performance of actions such as, for example, deployment management, inventory management, power management, thermal management, etc. The BMC 123 comprises a specialized processor that monitors the physical state of the host device 110 or other hardware. The BMC 123 may use one or more sensors (not shown) to measure parameters such as, for example, temperature, humidity, power-supply voltage, fan speeds, communications parameters and functions of the host device OS 124, and other operating systems associated with the host device 110. The BMC 123 can be part of an intelligent platform management interface (IPMI) and may be a component of the motherboard or main circuit board of the host device 110.

A non-limiting example of a BMC 123 is a remote access controller (RAC) such as, for example, an integrated Dell RAC (iDRAC). An iDRAC allows information technology (IT) administrators to monitor, manage, update, troubleshoot, and remediate the host device 110 (e.g., server) out-of-band from any location without the use of agents. The BMC 123 includes hardware and software that provide a variety of features including, but not necessarily limited to, device management, monitoring, power cycling, authentication, data collection and data analytics.

The host device OS 124 may comprise, for example, a commercially-available and/or open source operating system. The host device 110 further includes a basic input/output system (BIOS) (not shown), a BIOS non-volatile random-access memory (NVRAM) (not shown) or other persistent storage of the BIOS. In a non-limiting illustrative example, the BIOS can be in the form of firmware and/or software which includes a program that starts a computer system after it is powered on, and manages data flow between a computer's operating system (e.g., host device OS 124) and attached devices, such as, for example, a hard disk, video adapter, keyboard, mouse, printer, etc. The BIOS can be embedded on a memory chip on a system board or motherboard of the host device 110, and function as an interface between hardware of the host device 110 and the host device OS 124.

The host device 110 is connected to one or more networks to communicate with external devices such as, for example, one or more user devices 102, which may be used by, for example, administrators or customers of an enterprise. The networks comprise at least a portion of a global computer network such as the Internet, although other types of networks can be part of the networks, including a wide area network (WAN), a local area network (LAN), a satellite network, a telephone or cable network, a cellular network, a wireless network such as a WiFi or WiMAX network, or various portions or combinations of these and other types of networks. The networks comprise combinations of multiple different types of networks each comprising processing devices configured to communicate using Internet Protocol (IP) or other related communication protocols.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The host device 110 illustratively comprises a computer, server or other type of processing device. Each such processing device generally comprises at least one processor and an associated memory, and implements one or more functional modules for controlling certain features of the disclosed techniques for validating subordinate management controllers using subordinate management controller identity certificates.

At least a portion of the host device 110 can be implemented with virtual machines (VMs), containers, etc. The host device 110 and/or components thereof can comprise, for example, a desktop, laptop or tablet computer, server, storage device or other type of processing device. Such a device is an example of what is more generally referred to herein as a "processing device." Some of the processing devices are also generally referred to herein as "computers." The host device 110 in some embodiments comprises a computer associated with a particular company, organization or other enterprise.

The terms "user," "customer," "client" or "administrator" herein are intended to be broadly construed so as to encompass numerous arrangements of human, hardware, software or firmware entities, as well as combinations of such entities. At least a portion of the available services and functionalities provided by the host device 110 and/or components thereof in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the host device 110.

The host device 110 illustratively provides time synchronization services on behalf of each of one or more users associated with the host device 110.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

It is assumed that the platform for implementing the disclosed techniques for validating subordinate management controllers using subordinate management controller identity certificates and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the platform for implementing the disclosed techniques for validating subordinate management controllers using subordinate management controller identity certificates, and the elements thereof, can be implemented in the form of one or more LXCs running on one or more VMs. Other arrangements of one or more processing devices of a processing platform can be used to implement the disclosed certificate-based validation of subordinate management controllers techniques. Other portions of the system 100 can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements of the platform for implementing the disclosed certificate-based validation of subordinate management controllers techniques, and the portions thereof, can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

Figure 2:
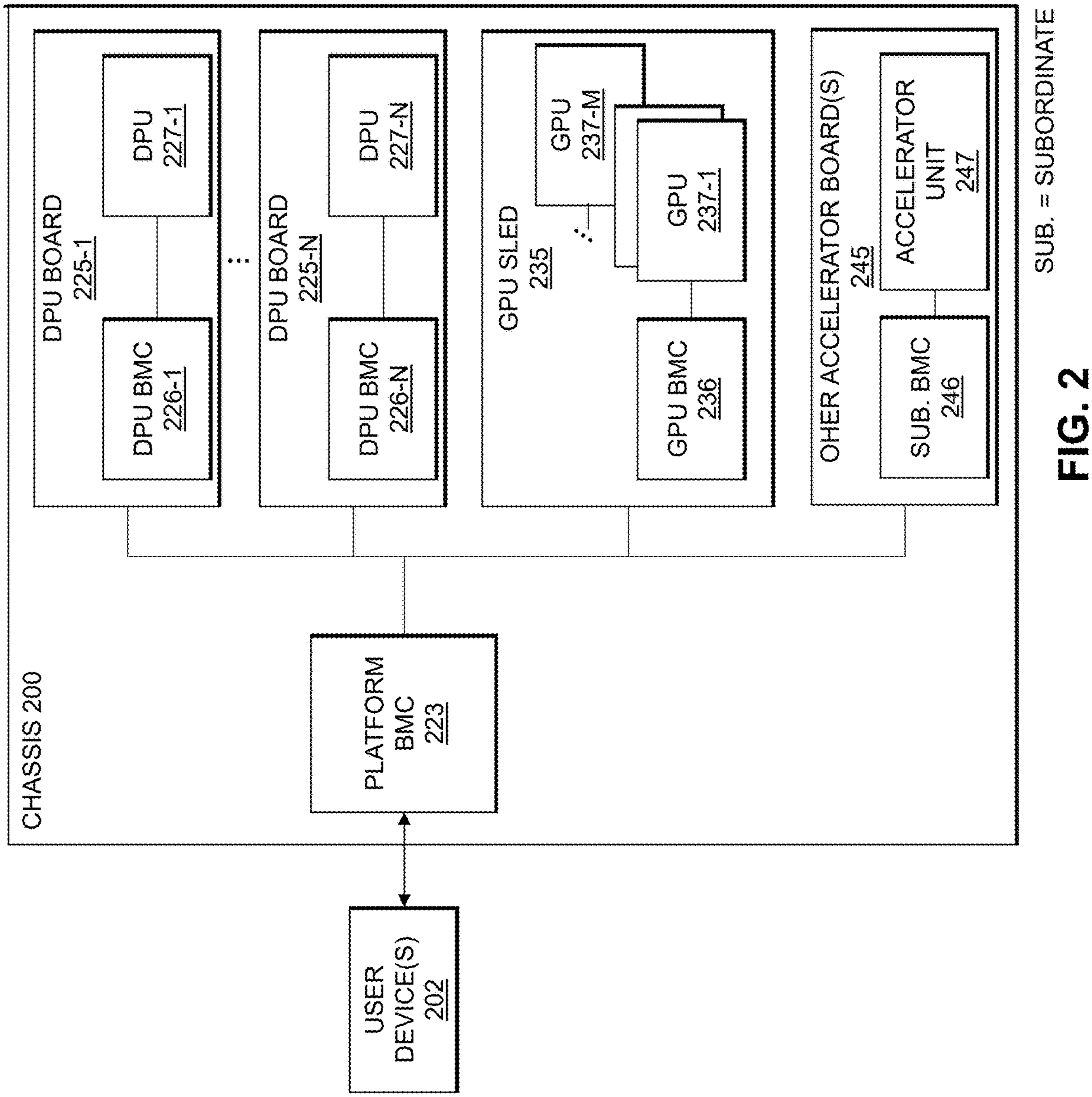
FIG. 2 illustrates the chassis of FIG. 1 in further detail in an illustrative embodiment.

FIG. 2 illustrates a chassis 200 in an illustrative embodiment. As noted above, DPUs, GPUs and other accelerator units increasingly include dedicated management controllers, such as baseboard management controllers. Such management controllers of the DPUs and/or GPUs are often implemented as subordinate management controllers with respect to a platform management controller (e.g., a BMC) of a chassis on which the DPUs and/or GPUs are deployed.

In the example of FIG. 2, the chassis 200 comprises, for example, a platform BMC 223, one or more DPU boards 225-1 through 225-N, at least one GPU sled 235 and one or more other accelerator boards 245. A given DPU board 225-*i* may comprise a DPU BMC 226-*i* (sometimes referred to herein as a subordinate BMC or a subordinate management controller) and a DPU 227-*i*. The GPU sled 235 may comprise at least one GPU BMC 236 (sometimes referred to herein as a subordinate BMC or a subordinate management controller) and one or more GPUs 237-1 through 237-M.

A given accelerator board 245-*i* may comprise a subordinate BMC 246-*i* (sometimes referred to herein as a subordinate management controller) and an accelerator unit 247-*i*. The accelerator unit 247-*i* may be implemented, for example, as an FPGA, an IPU or an NPU, as would be apparent to a person of ordinary skill in the art.

The chassis 200 may be connected to one or more networks to communicate with external devices such as, for example, one or more user devices 202, which may be used by, for example, administrators or customers of an enterprise.

The disclosed techniques for validating subordinate management controllers using subordinate management controller identity certificates may be employed by the platform BMC 223 to validate one or more of the subordinate management controllers (e.g., DPU BMCs 226, GPU BMCs 236 and/or subordinate BMCs 246), as discussed further below in conjunction with FIGS. 4A and 4B, for example.

Figure 3:
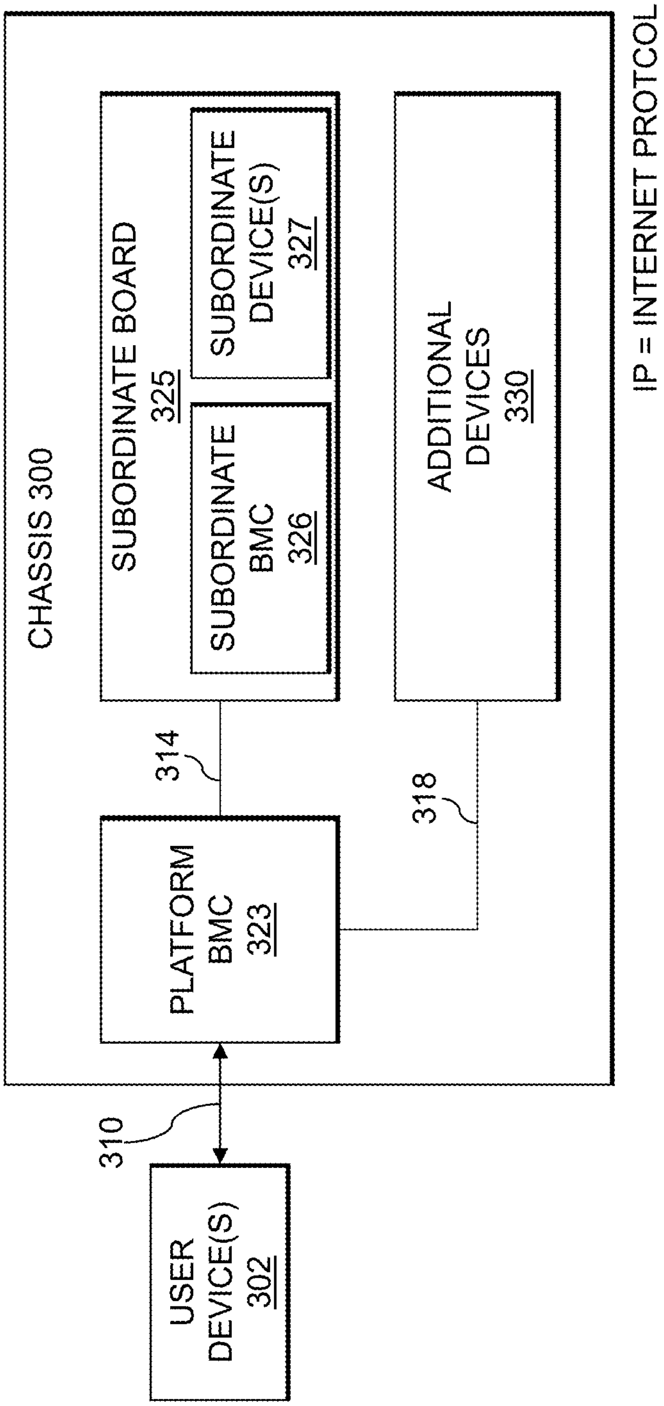
FIG. 3 illustrates a validation of one or more management controllers in a chassis in an illustrative embodiment.

FIG. 3 illustrates a validation of one or more management controllers in a chassis 300 in an illustrative embodiment. In the example of FIG. 3, the chassis 300 comprises, for example, a platform BMC 323, at least one subordinate board 325 and one or more additional devices 330. The at least one subordinate board 325 may comprise a subordinate BMC 326 (sometimes referred to herein as a subordinate management controller) and one or more subordinate devices 327.

The chassis 300 may be connected to one or more networks, represented in FIG. 3 as one or more connections 310, to communicate with external devices such as, for example, one or more user devices 302, which may be used by, for example, administrators or customers of an enterprise. The user devices 302 and the platform BMC 323 may validate one another using a TLS (Transport Layer Security) connection.

The one or more additional devices 330 may comprise chassis devices (e.g., expansion cards, disk drives, power supply units, central processing units and/or memories) having an assigned IP address. Thus, the platform BMC 323 may communicate with the additional devices 330 using connection 318 and validate the additional devices 330 using a Security Protocol and Data Model (SPDM), for example, in a known manner.

An IP address is typically not assigned to a subordinate BMC, such as subordinate BMC 326. In existing implementations, a customer or another user of user device 302 typically has no direct access to the subordinate BMC 326. Thus, there is no way for the customer or another user of user device 302 to validate the subordinate BMC 326, for example, by establishing a TLS connection with the subordinate BMC 326 because the subordinate BMC 326 typically does not have an external IP address.

Information coming on connection 314 from (i) the subordinate BMC 326 or (ii) subordinate devices 327, managed by the subordinate BMC 326, are typically presented under a certificate of the platform BMC 323 even though the platform BMC 323 has not validated the subordinate BMC 326 or the subordinate devices 327.

The standard way to secure a reverse proxy to an origin server or a back-to-back (B2B) Redfish server would be to provision TLS connections between the platform BMC 323 and the subordinate BMCs 326 but there are several complications. Normally, a certificate on a platform BMC and a subordinate BMC is self-signed or provisioned by the customer once it is added to the customer network and given a fully qualified domain name (FQDN). In this model, the customer assumes the responsibility of trusting the supply chain and the of the hardware, firmware, and software that they are providing a certificate to. The TLS certificate must be generated for the subordinate BMC (which is acting as a server) but the subordinate BMC does not know its own domain name to put in the common name of the certificate. In addition, a certificate authority (CA) that signs the subordinate BMC certificate must be added to a trust store on the platform BMC.

One or more aspects of the disclosure recognize that platform BMCs 323 and subordinate BMCs 326 talk to each other on a dedicated internal network. Thus, the platform BMC 323 must take the responsibility of verifying the integrity of the subordinate BMC 326 on behalf of the user. Given that there are a limited number of trusted vendors for accelerator units, the platform BMC 323 can carry a trust store of the CA certificates for the known vendors.

In one or more embodiments, the vendors place device identity certificates on subordinate BMCs 326 and the firmware of the subordinate BMC 326 is modified to use device identity certificates on the dedicated internal BMC-to-BMC network. To further ensure integrity, the vendor may embed a signed measurement manifest in the firmware of the subordinate BMC 326. The subordinate BMC 326 can perform a measured boot into its trusted platform module (TPM) that can be retrieved (e.g., via Redfish) by the platform BMC 323. The signed measurement manifest may be retrievable by the platform BMC 323, for example, using a new Redfish method. In this manner, the platform BMC 323 can establish the integrity of the subordinate BMC 326 before the platform BMC 323 presents information retrieved from the subordinate BMC 326 under the certificate of the platform BMC 323.

Figure 4A:
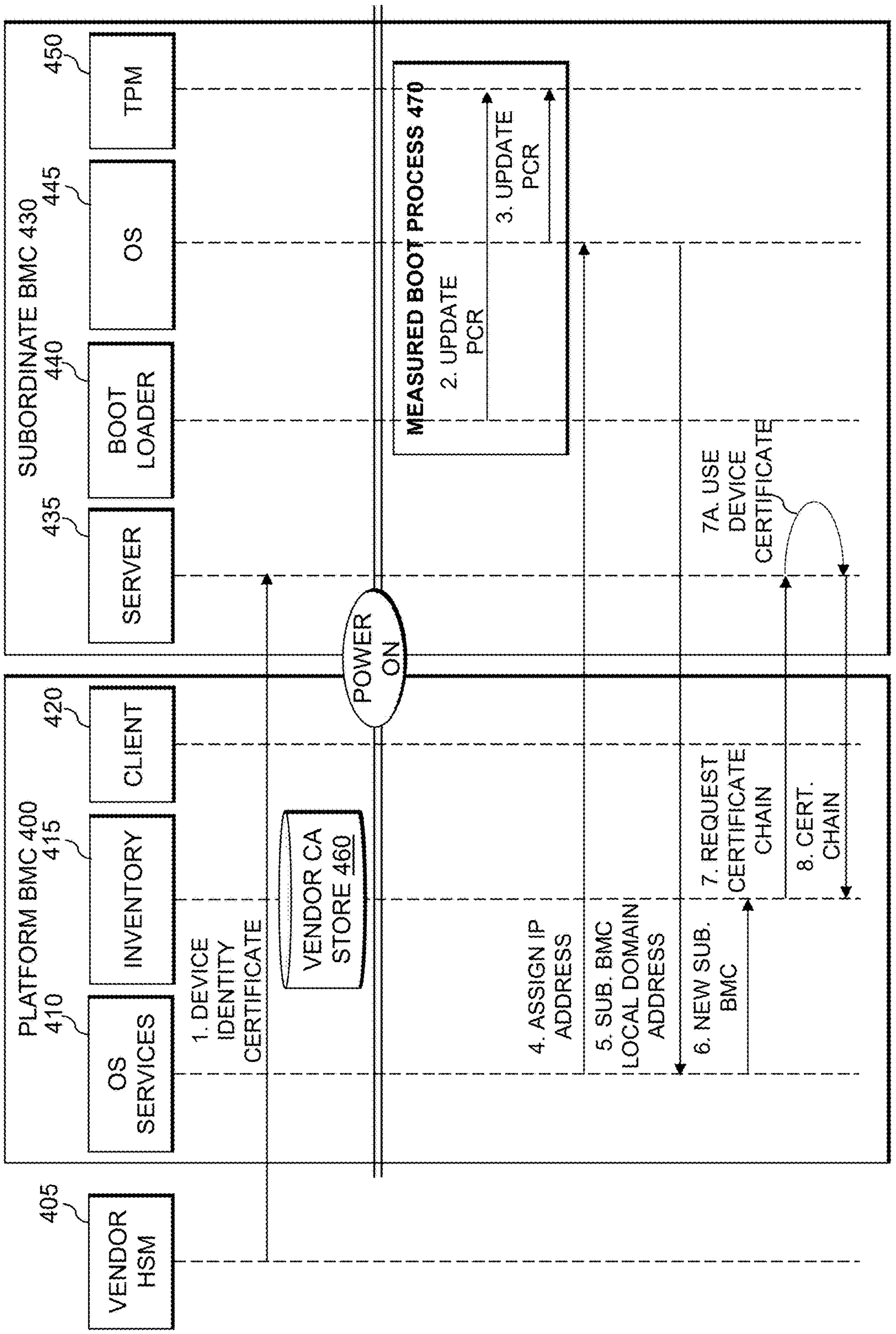
FIGS. 4A and 4B are communication diagrams illustrating a validation of one or more subordinate management controllers in an illustrative embodiment.
Figure 4B:
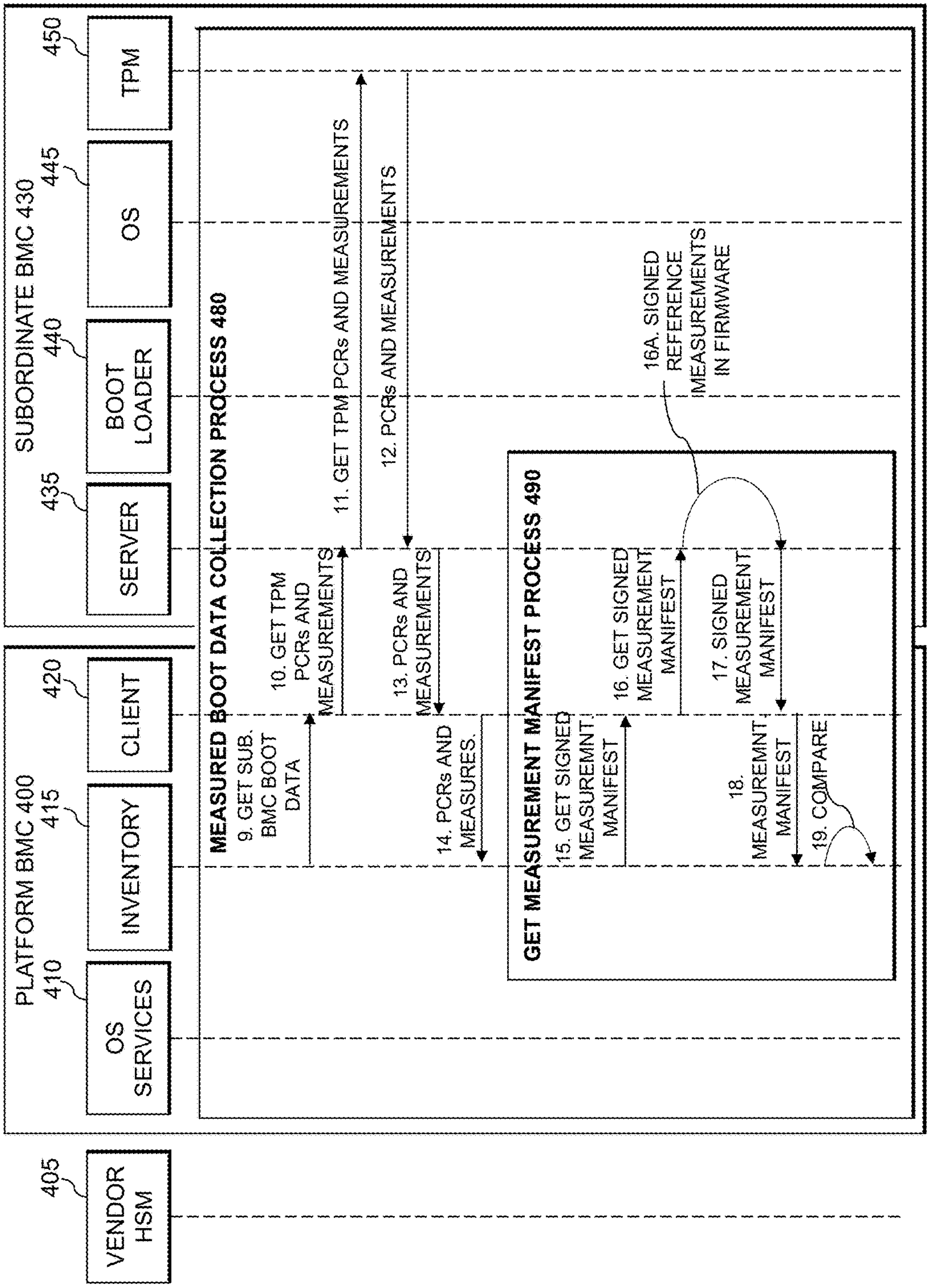

FIGS. 4A and 4B are communication diagrams illustrating a validation by a platform BMC 400 of one or more subordinate management controllers in an illustrative embodiment. In the example of FIG. 4A, a hardware security module (HSM) 405 of a vendor of an accelerator unit having a subordinate BMC 430 provides a device identity certificate in step 1 to a server 435 (e.g., a Redfish server) of the subordinate BMC 430. The vendor or manufacture of the accelerator unit having the subordinate BMC 430 may be another vendor or manufacture than the vendor or manufacturer of the platform BMC 400. Thus, the vendor or manufacturer of the accelerator unit will provision a substantially unique device identity certificate on the accelerator unit and signed by the vendor CA, for example, in the vendor factory. The device identity certificate may comprise a BMC2BMC alternate name (e.g., in the form of model-serial.local). The vendor CA certificate may be embedded in a vendor CA store 460 of the platform BMC 400 (which may be part of the firmware of the platform BMC 400). If the accelerator unit supports firmware measurements, the vendor CA key that signs firmware measurement manifests may also be added to the vendor CA store 460 of the platform BMC 400.

If the subordinate BMC 430 has a TPM 450 and supports measured boot, when the subordinate BMC 430 boots, for example, when the main power is turned on, the boot loader 440 (Unified Extensible Firmware Interface (UEFI)) may measure the firmware and update, in step 2, as part of a measured boot process 470, one or more PCRs (Platform Configuration Registers) of a TPM 450, such as TPM PCRs 1-7 and logs including system firmware, optional ROMs, a partition table and a secure boot state.

In step 3, the operating system 445 (e.g., a Grub, Kernel and/or a systemd) of the subordinate BMC 430 updates one or more additional TPM PCRs and logs, for example, for MOK (Machine Owner Key) certificate, kernel, RAMFS file system and kernel command line.

As noted above, the network between the platform BMC 400 and the subordinate BMC 430 is an isolated private network. Thus, the platform BMC 400 provides network services in at least some embodiments and the OS services 410 of the platform BMC 400 assign an IP address to the subordinate BMC 430 in step 4. Since the platform BMC 400 is likely multi-homed to the customer network and potentially other subordinate BMCs, an IPv6 ULA (unique local address) network may be employed in some embodiments to avoid address collisions. In this case, IPv6 SLAAC (StateLess Address Auto Configuration) may be used to assign an IP address to the subordinate BMC 430 (stateful Dynamic Host Configuration Protocol (DHCP) v6 is also an option to assign the IP address).

In step 5, the operating system 445 of the subordinate BMC 430 advertises itself (e.g., using a local domain address) to the platform BMC 400, for example, using mDNS (Multicast Domain Name System). The platform BMC 400 assigns a local domain entry that matches the alternate name in the subordinate BMC device identity certificate. The platform BMC 400 discovers the IPv6 address and Redfish service of the subordinate BMC 430. Alternatively, DHCP or LLDP (Link Layer Discovery Protocol) could be used instead of mDNS.

The inventory collector 415 on the platform BMC 400 is notified by the OS services 410 in step 6 that a subordinate BMC 430 has been discovered. The inventory collector 415 requests the device certificate chain in step 7 from the server 435 (e.g., a Redfish server) of the subordinate BMC 430 and performs a challenge of the subordinate BMC 430 proof of possession of corresponding private key. The server 435 of the subordinate BMC 430 uses the device certificate in step 7A to respond to the challenge of the subordinate BMC 430 (e.g., to validate that the subordinate BMC 430 has the device certificate).

The subordinate BMC 430 detects one or more show certificate requests from the internal BMC2BMC interface and the server 435 returns the device certificate chain (e.g., anchored in the vendor CA certificate of the subordinate BMC 430). If the subordinate BMC 430 is dual-homed on the customer network (e.g., it has a dedicated management port), the subordinate BMC 430 would likely use a self-signed or customer-provisioned certificate on the internal BMC2BMC interface. Customer provisioning of a certificate on another interface should not interfere with the use of the device identity certificate on the BMC2BMC network. The platform BMC 400 then validates the certificate chain of the subordinate BMC 430. The platform BMC 400 may be pre-provisioned with the CA that signed the certificate chain of the subordinate BMC 430 (either as a vendor CA certificate carried in the firmware of the platform BMC 400 or configured by the customer). If the certificate chain of the subordinate BMC 430 is validated in step 8, the subordinate BMC 430 is considered to be trusted hardware. If the certificate chain of the subordinate BMC 430 cannot be verified or fails to verify, a reverse proxy or a B2B Redfish operation can be disabled and the user notified.

In the example of FIG. 4B, as part of a measured boot data collection process 480, (e.g., when the subordinate BMC 430 has a TPM 450 and supports measured boot), in step 9, the inventory collector 415 of the platform BMC 400 will collect boot data (e.g., firmware, software and secure boot status) of the subordinate BMC 430, for example, via a client 420 (e.g., a Redfish client) of the platform BMC 400.

The client 420 requests the TPM PCRs and measurements in step 10 (e.g., of the firmware, software and secure boot status) of the subordinate BMC 430 from the server 435 of the subordinate BMC 430. In step 11, the server 435 of the subordinate BMC 430 retrieves the TPM PCRs and measurements from the TPM 450 of the subordinate BMC 430.

The TPM 450 of the subordinate BMC 430 then returns the PCRs and measurements in step 12 to the server 435 of the subordinate BMC 430. The server 435 of the subordinate BMC 430 returns the PCRs and measurements in step 13 to the client 420 of the platform BMC 400.

The client 420 of the platform BMC 400 then returns the PCRs and measurements in step 14 to the inventory collector 415 of the platform BMC 400.

In step 15, as part of a get measurement manifest process 490, the inventory collector 415 of the platform BMC 400 requests the signed reference measurements from the client 420 of the platform BMC 400. A Redfish TPM measurement implementation, for example, does not currently support requesting signed reference measurements in this manner, but such a feature could be added to future standards or accomplished using OEM (original equipment manufacturer) extensions. Alternatively, if the platform BMC 400 is responsible for firmware updates of the subordinate BMC 430, the signed manifest can be embedded in the firmware payload (e.g., in a similar manner as PLDM (Platform Level Data Model) firmware updates). The signed reference measurements can be extracted and saved by the platform BMC 400.

The client 420 requests the signed reference measurements of the firmware and software of the subordinate BMC 430 from the server 435 of the subordinate BMC 430 in step 16. The server 435 of the subordinate BMC 430 obtains the signed reference measurements in firmware in step 16A and returns the signed reference measurements to the client 420 of the platform BMC 400 in step 17.

In step 18, the client 420 of the platform BMC 400 returns the signed reference measurements to the inventory collector 415. The inventory collector 415 compares the current measurements to the expected reference measurements in step 19. The expected reference measurements could be vendor signed measurements that were extracted from the last firmware update of the subordinate BMC 430, for example. Alternatively, the reference measurements could be read from the subordinate BMC 430 and returned using Redfish via an extension to Redfish or an updated version of Component Integrity Schema (e.g., that can currently return a measurement manifest for SPDM but not TPM). If the subordinate BMC measurements fail to verify in step 19, a reverse proxy or a B2B Redfish operation can be disabled and the user notified, for example.

Figure 5:
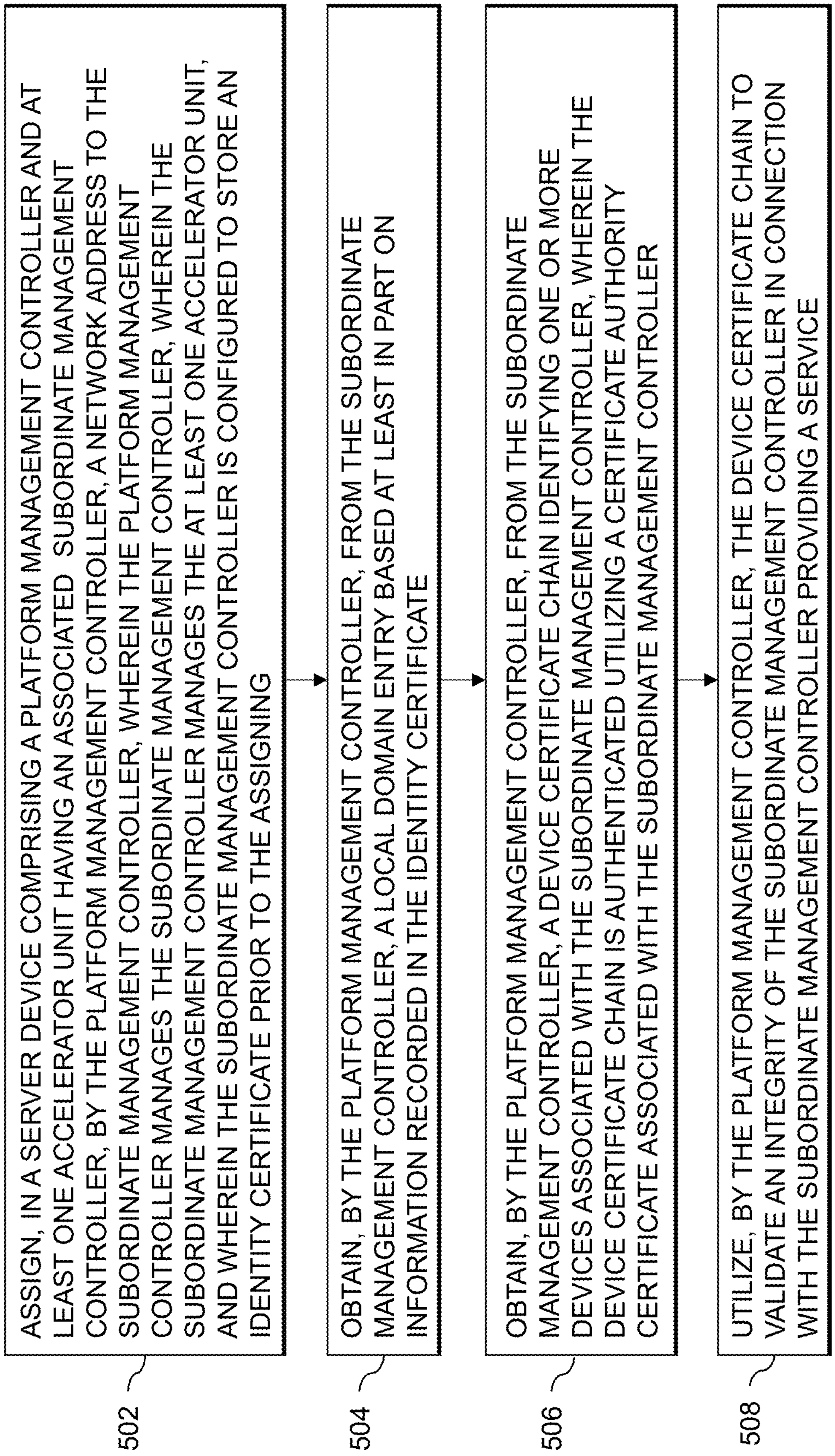
FIG. 5 is a flow chart illustrating an exemplary implementation of a process for certificate-based validation of subordinate management controllers in an illustrative embodiment.

FIG. 5 is a flow chart illustrating an exemplary implementation of a process for validating subordinate management controllers using subordinate management controller identity certificates, in accordance with an illustrative embodiment. In the example of FIG. 5, a network address is assigned, in a server device comprising a platform management controller and at least one accelerator unit having an associated subordinate management controller, in step 502, to the subordinate management controller, by the platform management controller, wherein the platform management controller manages the subordinate management controller, wherein the subordinate management controller manages the at least one accelerator unit, and wherein the subordinate management controller is configured to store an identity certificate prior to the assigning.

In step 504, the platform management controller obtains, from the subordinate management controller, a local domain entry based at least in part on information recorded in the identity certificate.

In step 506, the platform management controller obtains, from the subordinate management controller, a device certificate chain identifying one or more devices associated with the subordinate management controller, wherein the device certificate chain is authenticated utilizing a certificate authority certificate associated with the subordinate management controller (e.g., a certificate authority certificate of a vendor of the subordinate management controller).

The platform management controller may utilize the device certificate chain in step 508 to validate an integrity of the subordinate management controller, in connection with the subordinate management controller providing a service. The integrity of the subordinate management controller may be validated, for example, according to a designated integrity policy (e.g., that checks for authentic hardware and/or that expected firmware is being used).

In one or more embodiments, the subordinate management controller comprises a trusted platform module that records one or more boot measured values associated with a boot process of the subordinate management controller and wherein the platform management controller obtains at least one of the one or more boot measured values for storage in an inventory of the platform management controller. A client of the platform management controller may obtain a signed version of the at least one boot measured value from a server of the subordinate management controller and wherein the platform management controller compares the signed version of the at least one boot measured value to the at least one boot measured value stored in the inventory of the platform management controller.

In at least one embodiment, the platform management controller comprises a trust store of one or more vendors of subordinate management controllers. The identity certificate of the subordinate management controller may be stored by the vendor of the subordinate management controller at one or more of a time of manufacture and a time of sale of the subordinate management controller.

In some embodiments, the identity certificate of the subordinate management controller is signed by the vendor of the subordinate management controller at one or more of a time of manufacture and a time of sale of the subordinate management controller. The obtaining the device certificate chain identifying the one or more devices associated with the subordinate management controller may further comprise determining whether the subordinate management controller comprises a private key of the subordinate management controller.

The particular processing operations and other network functionality described in conjunction with the flow diagrams of FIGS. 4A, 4B and 5, for example, are presented by way of illustrative example only, and should not be construed as limiting the scope of the disclosure in any way. Alternative embodiments can use other types of processing operations to provide functionality for validating subordinate management controllers using subordinate management controller identity certificates. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

In one or more embodiments, the disclosed techniques for certificate-based validation of subordinate management controllers mitigate spoofing attacks between the platform BMC 400 and the subordinate BMC 430, for example, by adding a trust store of the vendors of the subordinate BMC and performing a proof-of-possession (PoP) on the subordinate BMC before relaying information from the subordinate BMC under the certificate of the platform BMC. The platform BMC may provide trusted measurements for all devices in the system because the platform BMC builds up trust dynamically from a prior known trusted CA store and offloads the PoP to inside the server for devices inside of the server. In at least some embodiments, the trust of the subordinate BMC is tied to a validation of the subordinate BMC running firmware and software measurements against vendor signed reference measurements. The signed reference measurements may be provided via Redfish, for example. The measured boot inside of a server may be based on known hashes given to platform BMC.

It should also be understood that the disclosed techniques for validating subordinate management controllers using subordinate management controller identity certificates can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for certificate-based validation of subordinate management controllers may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based subordinate management controller validation engine, or portions thereof, are illustratively implemented for use by tenants of such a multi-tenant environment.

Cloud infrastructure as disclosed herein can include cloud-based systems. Virtual machines provided in such systems can be used to implement at least portions of a subordinate management controller validation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
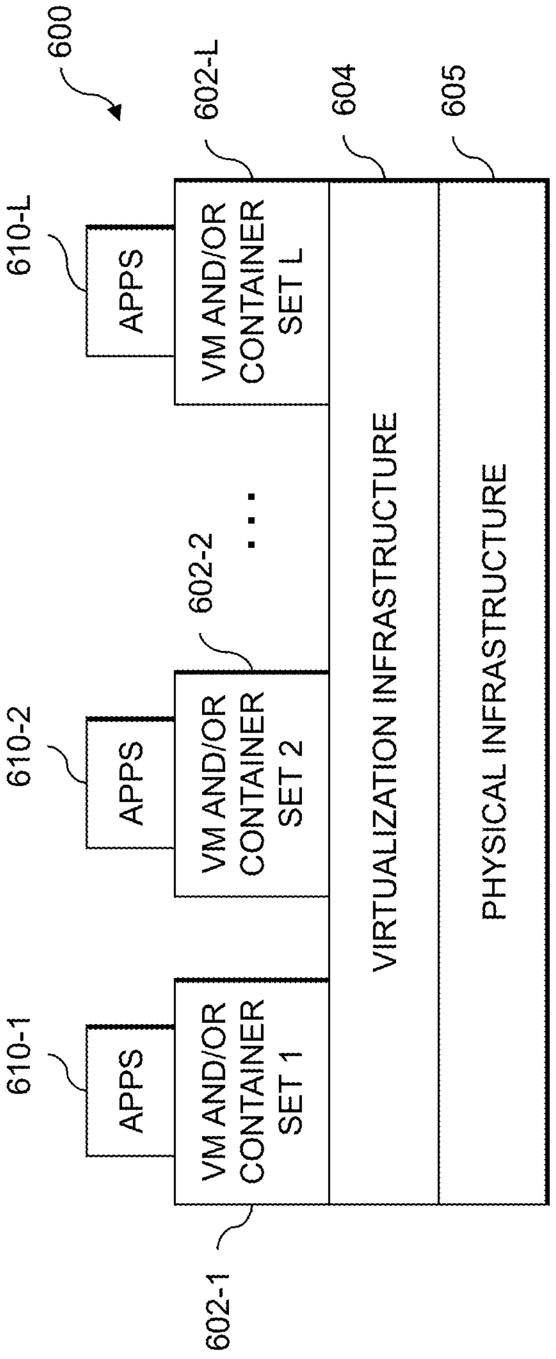
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple VMs and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide certificate-based validation of subordinate management controllers functionality of the type described above for one or more processes running on a given one of the VMs. For example, each of the VMs can implement control logic for certificate-based validation of subordinate management controllers and associated integrity verification functionality for one or more processes running on that particular VM.

The hypervisor platform may have an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide certificate-based validation of subordinate management controllers functionality of the type described above for one or more processes running on different ones of the containers. For example, a container host device supporting multiple containers of one or more container sets can implement one or more instances of control logic for certificate-based validation of subordinate management controllers and associated integrity verification functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), an FPGA, a central processing unit (CPU), a GPU, a TPU, an IPU, a VPU, an NPU, a DPU, a System-On-Chip (SOC) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
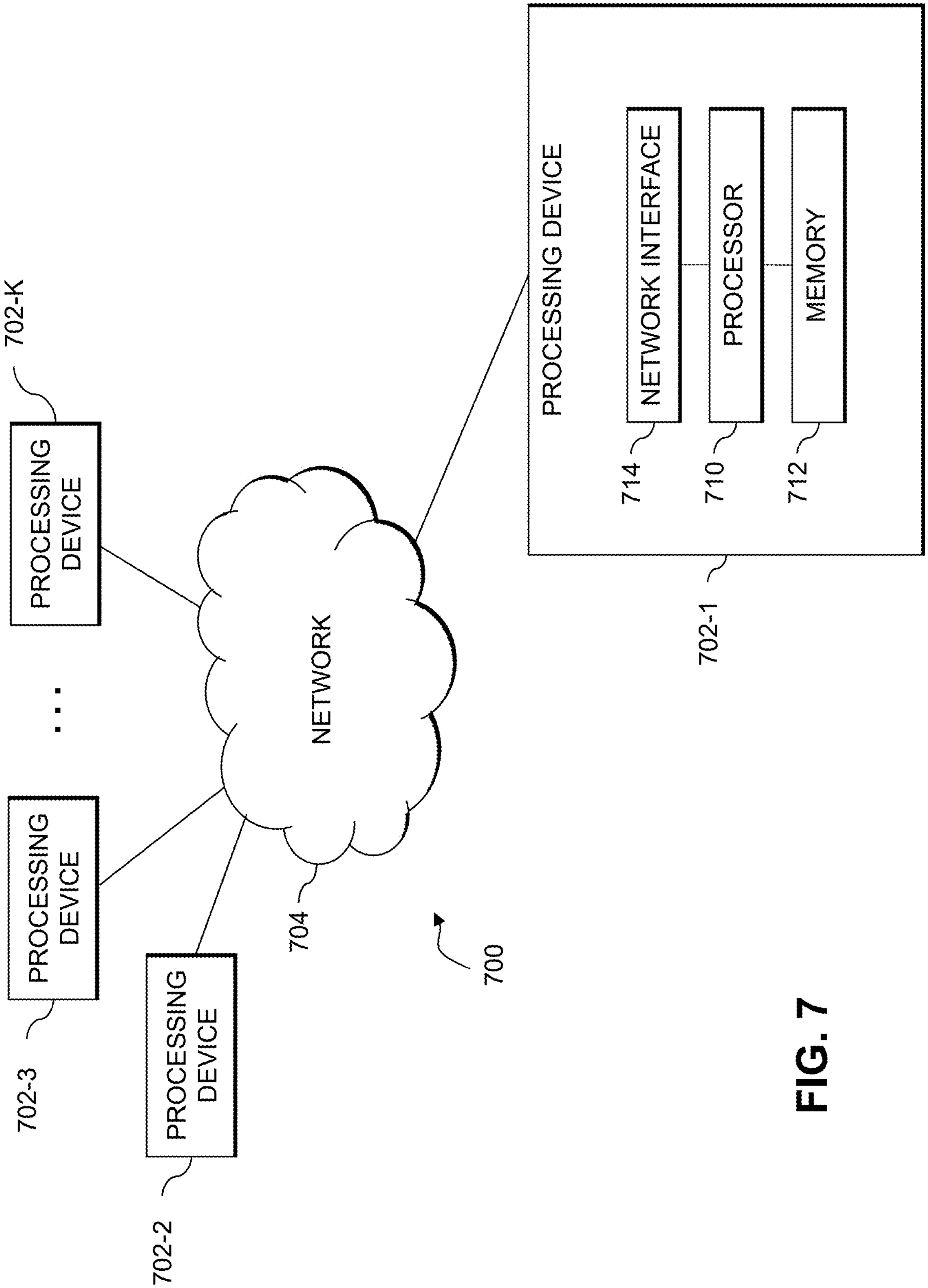
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

assigning, in a server device comprising a platform management controller and at least one accelerator unit having an associated subordinate management controller, by the platform management controller, a network address to the subordinate management controller, wherein the platform management controller manages the subordinate management controller, wherein the subordinate management controller manages the at least one accelerator unit, and wherein the subordinate management controller is configured to store an identity certificate prior to the assigning;

obtaining, by the platform management controller, from the subordinate management controller, a local domain entry based at least in part on information recorded in the identity certificate;

obtaining, by the platform management controller, from the subordinate management controller, a device certificate chain identifying one or more devices associated with the subordinate management controller, wherein the device certificate chain is authenticated utilizing a certificate authority certificate associated with the subordinate management controller; and utilizing, by the platform management controller, the device certificate chain to validate an integrity of the subordinate management controller, in connection with the subordinate management controller providing a service;

wherein the method is performed by at least one processing device comprising a processor coupled to a memory.

2. The method of claim 1, wherein the subordinate management controller comprises a trusted platform module that records one or more boot measured values associated with a boot process of the subordinate management controller and wherein the platform management controller obtains at least one of the one or more boot measured values for storage in an inventory of the platform management controller.

3. The method of claim 2, wherein a client of the platform management controller obtains a signed version of the at least one boot measured value from a server of the subordinate management controller and wherein the platform management controller compares the signed version of the at least one boot measured value to the at least one boot measured value stored in the inventory of the platform management controller.

4. The method of claim 1, wherein the platform management controller comprises a trust store of one or more vendors of subordinate management controllers.

5. The method of claim 1, wherein the identity certificate of the subordinate management controller is one or more of stored by, and signed by, a vendor of the subordinate management controller at one or more of a time of manufacture and a time of sale of the subordinate management controller.

6. The method of claim 1, wherein the obtaining the device certificate chain identifying the one or more devices associated with the subordinate management controller further comprises determining whether the subordinate management controller comprises a private key of the subordinate management controller.

7. The method of claim 1, wherein the identity certificate of the subordinate management controller is stored in the subordinate management controller by a vendor of the subordinate management controller prior to the assigning.

8. An apparatus comprising:

at least one processing device comprising a processor coupled to a memory;

the at least one processing device being configured to implement the following steps:

assigning, in a server device comprising a platform management controller and at least one accelerator unit having an associated subordinate management controller, by the platform management controller, a network address to the subordinate management controller, wherein the platform management controller manages the subordinate management controller, wherein the subordinate management controller manages the at least one accelerator unit, and wherein the subordinate management controller is configured to store an identity certificate prior to the assigning;

obtaining, by the platform management controller, from the subordinate management controller, a local domain entry based at least in part on information recorded in the identity certificate; and obtaining, by the platform management controller, from the subordinate management controller, a device certificate chain identifying one or more devices associated with the subordinate management controller, wherein the device certificate chain is authenticated utilizing a certificate authority certificate associated with the subordinate management controller; and utilizing, by the platform management controller, the device certificate chain to validate an integrity of the subordinate management controller, in connection with the subordinate management controller providing a service.

9. The apparatus of claim 8, wherein the subordinate management controller comprises a trusted platform module that records one or more boot measured values associated with a boot process of the subordinate management controller and wherein the platform management controller obtains at least one of the one or more boot measured values for storage in an inventory of the platform management controller.

10. The apparatus of claim 9, wherein a client of the platform management controller obtains a signed version of the at least one boot measured value from a server of the subordinate management controller and wherein the platform management controller compares the signed version of the at least one boot measured value to the at least one boot measured value stored in the inventory of the platform management controller.

11. The apparatus of claim 8, wherein the platform management controller comprises a trust store of one or more vendors of subordinate management controllers.

12. The apparatus of claim 8, wherein the identity certificate of the subordinate management controller is one or more of stored by, and signed by, a vendor of the subordinate management controller at one or more of a time of manufacture and a time of sale of the subordinate management controller.

13. The apparatus of claim 8, wherein the obtaining the device certificate chain identifying the one or more devices associated with the subordinate management controller further comprises determining whether the subordinate management controller comprises a private key of the subordinate management controller.

14. A non-transitory processor-readable storage medium having stored therein program code of one or more software programs, wherein the program code when executed by at least one processing device causes the at least one processing device to perform the following steps:

assigning, in a server device comprising a platform management controller and at least one accelerator unit having an associated subordinate management controller, by the platform management controller, a network address to the subordinate management controller, wherein the platform management controller manages the subordinate management controller, wherein the subordinate management controller manages the at least one accelerator unit, and wherein the subordinate management controller is configured to store an identity certificate prior to the assigning;

obtaining, by the platform management controller, from the subordinate management controller, a local domain entry based at least in part on information recorded in the identity certificate;

obtaining, by the platform management controller, from the subordinate management controller, a device certificate chain identifying one or more devices associated with the subordinate management controller, wherein the device certificate chain is authenticated utilizing a certificate authority certificate associated with the subordinate management controller; and utilizing, by the platform management controller, the device certificate chain to validate an integrity of the subordinate management controller, in connection with the subordinate management controller providing a service.

15. The non-transitory processor-readable storage medium of claim 14, wherein the subordinate management controller comprises a trusted platform module that records one or more boot measured values associated with a boot process of the subordinate management controller and wherein the platform management controller obtains at least one of the one or more boot measured values for storage in an inventory of the platform management controller.

16. The non-transitory processor-readable storage medium of claim 15, wherein a client of the platform management controller obtains a signed version of the at least one boot measured value from a server of the subordinate management controller and wherein the platform management controller compares the signed version of the at least one boot measured value to the at least one boot measured value stored in the inventory of the platform management controller.

17. The non-transitory processor-readable storage medium of claim 14, wherein the platform management controller comprises a trust store of one or more vendors of subordinate management controllers.

18. The non-transitory processor-readable storage medium of claim 14, wherein the identity certificate of the subordinate management controller is one or more of stored by, and signed by, a vendor of the subordinate management controller at one or more of a time of manufacture and a time of sale of the subordinate management controller.

19. The non-transitory processor-readable storage medium of claim 14, wherein the obtaining the device certificate chain identifying the one or more devices associated with the subordinate management controller further comprises determining whether the subordinate management controller comprises a private key of the subordinate management controller.

20. The method of claim 1, wherein one or more of the platform management controller and the subordinate management controller comprise a baseboard management controller.

* * * * *